(12) United States Patent
Bruce et al.

(10) Patent No.: US 11,042,047 B1
(45) Date of Patent: Jun. 22, 2021

(54) MOBILE SYSTEM INCORPORATING FLEXIBLE AND TUNABLE OPTICALLY REFLECTIVE SKIN AND METHOD OF USE

(71) Applicant: SUNLIGHT AEROSPACE INC., Edison, NJ (US)

(72) Inventors: Allan James Bruce, Scotch Plains, NJ (US); Michael Cyrus, Castle Road, CO (US); Sergey Frolov, Murray Hill, NJ (US)

(73) Assignee: Sunlight Aerospace Inc., Edison, NJ (US)

( * ) Notice: Subject to any disclaimer, the term of this patent is extended or adjusted under 35 U.S.C. 154(b) by 0 days.

(21) Appl. No.: 15/344,983

(22) Filed: Nov. 7, 2016

Related U.S. Application Data (63) Continuation-in-part of application No. 14/466,931, filed on Aug. 22, 2014, now abandoned.

(51) Int. Cl.
  *G02F 1/01* (2006.01)
  *G02F 1/00* (2006.01)
  (Continued)

(52) U.S. Cl.
  CPC ........ *G02F 1/0131* (2013.01); *G02F 1/0072* (2013.01); *G02F 1/0121* (2013.01); *H04B 10/501* (2013.01); *H04B 10/60* (2013.01)

(58) Field of Classification Search
  CPC .... G02F 1/0131; G02F 1/0072; G02F 1/0121; H04B 10/60; H04B 10/501
  (Continued)

(56) References Cited

U.S. PATENT DOCUMENTS

| 3,552,826 A | 1/1971 | Hanes et al. |
| 3,706,485 A | 12/1972 | Fawcett et al. |

(Continued)

FOREIGN PATENT DOCUMENTS

| EP | 0664893 A1 | 8/1995 |
| EP | 0945254 B1 | 12/2004 |

(Continued)

OTHER PUBLICATIONS

Reflectivity-: New Technologies—Research Centre, University of West Bohemia, Univerzitní 8, 301 00 Plzeň, Czech Republic https://ttp.zcu.cz/en/laboratories/optical-properties/optical-properties/reflectivity.*

(Continued)

*Primary Examiner* — Stephone B Allen
*Assistant Examiner* — Rahman Abdur
(74) *Attorney, Agent, or Firm* — Mayer & Williams, PC; Stuart Mayer (57) ABSTRACT

A mobile system includes a self-supporting platform, a tunable reflective skin or film disposed on and secured to the mobile platform, one or more actuators and a controller. The tunable reflective skin or film includes one or more layers that are at least partially reflective to optical energy at one or more optical wavelengths. The skin or film is substantially flexible and/or stretchable and has an optical reflectivity to incident electromagnetic radiation of a given wavelength which is selectively variable when flexed and/or stretched. The actuators are able to flex and/or stretch the skin or film in response to receipt of a control signal. The controller generates the control signal based on a measured value of the optical reflectivity of the skin or film to the incident electromagnetic radiation of the given wavelength.

21 Claims, 7 Drawing Sheets

(51) Int. Cl.
*H04B 10/60* (2013.01)
*H04B 10/50* (2013.01)

(58) Field of Classification Search
USPC .......................................................... 359/239
See application file for complete search history.

(56) References Cited

U.S. PATENT DOCUMENTS

| | | | |
|---|---|---|---|
| 3,799,653 A | 3/1974 | Ikeda | |
| 4,101,698 A * | 7/1978 | Dunning | B44C 1/14 428/31 |
| 4,937,134 A | 6/1990 | Schrenk | |
| 5,367,375 A * | 11/1994 | Siebert | G01J 9/00 250/201.9 |
| 5,783,049 A | 7/1998 | Bright et al. | |
| 5,939,189 A | 8/1999 | Phillips et al. | |
| 6,366,013 B1 | 4/2002 | Leenders et al. | |
| 6,759,097 B2 * | 7/2004 | Phillips | B41M 3/14 427/510 |
| 6,926,952 B1 | 8/2005 | Weber et al. | |
| 6,999,156 B2 | 2/2006 | Chou et al. | |
| 7,304,781 B2 | 12/2007 | Chang-Hasnain et al. | |
| 7,859,519 B2 * | 12/2010 | Tulbert | G06F 3/0423 345/173 |
| 8,293,859 B2 * | 10/2012 | Marchand | C08F 297/08 526/348 |
| 8,362,184 B2 * | 1/2013 | Marchand | C08F 297/08 526/348 |
| 8,432,611 B1 * | 4/2013 | Wach | A61B 5/0084 359/587 |
| 8,433,207 B2 | 4/2013 | Shin et al. | |
| 8,726,806 B2 * | 5/2014 | Raksha | B05D 3/20 101/375 |
| 8,927,072 B2 * | 1/2015 | Whiteman | B42D 25/00 428/29 |
| 8,977,084 B2 | 3/2015 | Hulsey | |
| 9,320,201 B2 * | 4/2016 | Duncan | G02B 19/0019 |
| 9,391,700 B1 | 7/2016 | Bruce | |
| 2002/0105741 A1 * | 8/2002 | Platzer, Jr. | B60R 1/082 359/868 |
| 2002/0113200 A1 * | 8/2002 | Hajjar | G02B 6/35 250/227.26 |
| 2002/0160194 A1 * | 10/2002 | Phillips | B42D 25/29 428/403 |
| 2002/0186928 A1 | 12/2002 | Curtis | |
| 2004/0086282 A1 * | 5/2004 | Graves | H04B 10/60 398/202 |
| 2005/0117866 A1 | 6/2005 | Park et al. | |
| 2005/0163511 A1 * | 7/2005 | Cicchiello | G01S 7/481 398/170 |
| 2008/0001066 A1 * | 1/2008 | Ax | G01C 11/025 250/208.1 |
| 2008/0037103 A1 * | 2/2008 | Papavasiliou | G02B 26/0841 359/291 |
| 2009/0002668 A1 * | 1/2009 | Rohe | G03F 7/70116 355/67 |
| 2010/0062217 A1 | 3/2010 | Kurematsu | |
| 2010/0098430 A1 | 4/2010 | Chui | |
| 2010/0150511 A1 | 6/2010 | Arsenault et al. | |
| 2010/0245978 A1 | 9/2010 | Baumberg et al. | |
| 2011/0013300 A1 * | 1/2011 | Wu | G02B 26/0825 359/849 |
| 2012/0091699 A1 * | 4/2012 | Krueger | B42D 25/29 283/67 |
| 2012/0262789 A1 | 10/2012 | Xie et al. | |
| 2013/0004711 A1 | 1/2013 | Doi et al. | |
| 2013/0279004 A1 | 10/2013 | Foland et al. | |
| 2013/0313447 A1 * | 11/2013 | Tay | H01L 31/0203 250/551 |
| 2013/0344290 A1 | 12/2013 | Yu | |
| 2014/0032015 A1 * | 1/2014 | Chun | G08G 1/166 701/2 |
| 2014/0119020 A1 * | 5/2014 | Duncan | G09G 3/002 362/276 |
| 2015/0346398 A1 | 12/2015 | Gorodetsky | |
| 2016/0299270 A1 | 10/2016 | Kotov | |

FOREIGN PATENT DOCUMENTS

| | | |
|---|---|---|
| WO | 99/36262 | 7/1999 |
| WO | 2007/079149 A2 | 7/2007 |
| WO | 2010062217 A1 | 6/2010 |
| WO | 2013083624 | 6/2013 |
| WO | 2016/028641 A1 | 2/2016 |
| WO | 2016/028642 A1 | 2/2016 |

OTHER PUBLICATIONS

O'Brien et al., "Advanced Receivers for Free-space Optical Communications", Proc. SPIE 5614, 129-138, 2004.
Karp et al., "Planar Micro-optic Solar Concentrator", Optics Express, 18, 1122-33, 2010.
Bouchard et al., "Graded-index Planar Waveguide Solar Concentrator", Optics Lett., 39, 1197-1200, 2014.
Price et al., Wide-angle Planar Micro-tracking for Quasi-Static Microcell Concentrating Photovoltaics, Nature Comm., DOI 10.1038/ncomms7223, 2015.
Horwath et al., Broadband Backhaul Communication for Stratospheric Platforms, Proc. SPIE 6304, 2006.
Henniger et al., An Introduction to Free Space Optical Communications, Radio Engineering, 19, 203-212, 2010.
Carrasco-Casado et al., Free Space Laser Communications with UAVs, NATO-OTAN, RTO-MP-IST-099, p. 7, 2009.
Garlington et al., Analysis of Free Space Optics as a Transmission Technology, US Army Information Systems Engineering Command, WP AMSEL-IE-TS-05001, Mar. 2005.
Y. Li & C.Henry, Silicon Optical Bench Waveguide Technology, Optical Fiber Telecomm.IIIB, 319-76, Kaminow & Koch, Academic Press 1997.
Nanfang Yu, IEEE Journal of Selected Topics in Quantum Electronics, vol. 19, No. 3, May/Jun. 2013 Flat Optics: Controlling Wavefronts With Optical Antenna Metasurfaces.
Jose M. Castro, Energy collection efficiency of holographic planar solar concentrators, Applied Optics / vol. 49, No. 5 / Feb. 10, 2010.
C. Schlick, An inexpensive BRDF model for physically-based rendering, Computer Graphics Forum 13, 233, 1994.
Moghal et al., High performance, single-layer, anti-reflective optical coatings comprising mesa-porous silica nanoparticles, Appl. Mater. Interfaces, 4, 854-9, 2011.
Paivanranta et al., A wide-angle anti-reflection surface for the visible spectrum, Nanotechnology, 20, 375301, 2009.
Guldin et al., Self-cleaning antireflective optical coatings, Nano Lett., 13, 5329-35, 2013.
Fang et al., Nanoparticle stacks with graded indices Enhance the Omnidirectional Light Harvesting of Solar Cells and the Light Extraction of Light-Emitting Diodes, Adv. Functional Mat., 23, 1412-21, 2013.
Perl et al., Ultra broadband and wide-angle hybrid antireflection coatings with nanostructures, J. Photovoltaics, 4, 962-7, 2014.
Orlovskiy et al., Broadband dielectric mirrors, for optical diagnostics in ITER, Fusion Energy and Design, 88, 1284-7, 2013.
Karagodsky et al., Theoretical analysis of sub-wavelength high contrast grating reflectors, Optics Express, 18, 16973-82, 2010.
Hao et al., Broadband compact reflector based on all-dielectric sub-wavelength nanoparticle chains, Optical Engineering, 52, 068001, 2013.
Ricciardi et al., Broadband mirrors in the near-infrared based on sub-wavelength gratings in SOI, IEEE Photonics Journal, 2, 696-702, 2010.
Haley Birch, How to disappear completely, Chemistry World, 42-45, Jun. 2010.
Griggs et al.,Dynamic optical tags, Proc. SPIE 5441, 151-60, 2004.
Sumriddetchkajorn et al., High-dynamic-range, high-optical-isolation, wavelength-sensitive, thin film filter-based, variable fiber optic attenuator, Optical Engineering 45, 035004, 2006.

(56) References Cited

OTHER PUBLICATIONS

Li et al., "Broadband compact reflector based on all-dieletric subwavelength nanoparticle chains: reflecting lights beyond normal incidence with a very high reflectivity" SPIE Optical Engineering, 12 pages, Aug. 8, 2014.
Griggs et al., "Dynamic optical tags", Proceedings Optical Diagnostics of Living Cells II, vol. 5441, Jul. 19, 2004, p. 151.

* cited by examiner

MOBILE SYSTEM INCORPORATING FLEXIBLE AND TUNABLE OPTICALLY REFLECTIVE SKIN AND METHOD OF USE

CROSS-REFERENCE TO RELATED APPLICATION

This application is a continuation-in-part of U.S. patent application Ser. No. 14/466,931, filed Aug. 22, 2014 entitled "FLEXIBLE AND TUNABLE REFLECTIVE SKIN", the contents of which are incorporated herein by reference.

FIELD OF INVENTION

The present invention relates to a system or device which incorporates a free standing, or supported, skin which is flexible and exhibits tunable, or settable, optical reflectivity when the skin is stretched, flexed or otherwise deformed.

BACKGROUND

Untethered, unmanned mobile systems are increasingly being employed for transportation and other missions on land, sea and in the air. As this usage overlaps with human activity unmanned system management and operational safety become more challenging and more of a concern. Unmanned system management critically relies on an ability to remotely locate, identify, communicate and/or track unmanned platforms. Conventional systems commonly employ GPS and wireless telemetry for this purpose. These methods are not failsafe and as the usage and operating density of platforms increases they are likely to be inadequate for the task. It is therefore desirable to employ additional methods which can replace, or augment, current solutions.

Optical imaging is one such method, currently being considered in combination with computational image recognition plus deep learning for driverless automobiles. Free Space Optical (FSO) systems can also provide many options for advanced location and tracking capabilities with high capacity, low-latency, directional communication links.

The range and performance of such optical systems will typically depend on their ability to reflect or receive incoming light, or optical signals, and/or to transmit outgoing light or optical signals. Various incorporated optical systems may preferentially operate at different wavelengths or light intensities and in continuous, intermittent or periodic modes. System performance during missions may also be optimized by the active adjustment of these parameters, in response to variations in range, environmental conditions or other operational requirements.

SUMMARY

In one aspect, the invention provides skins or films that are mechanically durable and which exhibit settable or tunable optical reflection characteristics when subject to changes in shape or physical dimensions. Embodiments include skins with stacked sub-wavelength layers and nano-, or micro-, structures which experience dimensional changes and exhibit changeable reflectivity when the skins are stretched, flexed or otherwise changed in shape. In their original state the skins may be transmitting, reflecting or partially both.

The skins or films may be is distinguished from conventional reflectors in that it they are specifically designed to be mechanically durable and alter its reflectivity when stretched or flexed. In this regard the materials, structure and optical design are selected, or engineered, such that any critical values of dimension, refractive index or other essential characteristics are achieved during deformation.

A variety of flexible and transparent base materials including polymers and fluoro-polymers and standard engineering and design methods may be employed to achieve the desired characteristics. The latter includes single- or multi-layer structures, doped, composite and nano-structured layers or surfaces. The achievable reflectivity characteristics are appropriate for a wide range of devices.

In another aspect, the invention provides a mobile system that includes a self-supporting platform, a tunable reflective skin or film disposed on and secured to the mobile platform, one or more actuators and a controller. The tunable reflective skin or film includes one or more layers that are at least partially reflective to optical energy at one or more optical wavelengths. The skin or film is substantially flexible and/or stretchable and has an optical reflectivity to incident electromagnetic radiation of a given wavelength which is selectively variable when flexed and/or stretched. The actuators are able to flex and/or stretch the skin or film in response to receipt of a control signal. The controller generates the control signal based on a measured value of the optical reflectivity of the skin or film to the incident electromagnetic radiation of the given wavelength.

Embodiments of the present invention, summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Introduction

As explained in more detail below, a flexible and tunable optically reflective skin can be deployed on, or at, the surface of, or within, a mobile platform to enable the dynamic tuning of incoming and/or outgoing light, or optical signals for the purpose of optimizing or enhancing the performance of remote location, identification, tracking or other functional systems. Furthermore, the system in which such a skin is employed, may include means to actively monitor, analyze and adjust the reflectivity to attain a desired performance in use.

Such skins may have a variety of structures, be fabricated from a variety of materials and constructed by various means. They may be designed and implemented for a single function or have multiple functionality including multi-optical, structural, electrical, protection or other functions. Changes in the reflectivity of the skin may be achieved by changing the periodicity, aspect ratio or other characteristic of grating or interferometric layered structures in the skin. These changes may be uniformly or non-uniformly applied by flexing, stretching or physically deforming the reflective skin under an applied stimulus. Changes in environment conditions e.g. temperature may also effect changes. The range of achievable reflectivity may be in the range of 0-100%. The starting reflectivity without any applied stimulus may be some intermediate value e.g. 50% dependent on the designed skin structure.

A number of uses are illustrated below for the tunable optically reflective skin, which may be provided on various mobile vehicles and other mobile systems, including, without limitation, unmanned aerial systems (UAVs), marine systems, ground systems and wearable systems. In these applications the reflectivity of the skin is actively tuned, for example, to optimize optical imaging, identification, tracking or camouflage performance or to attenuate, or filter, incoming light to an optical receiver or outgoing light from an optical source on a mobile platform. Specific means are incorporated to measure, analyze and actively adjust the reflectivity of skin during use to enable dynamic tuning for optimizing system performance in a given application.

The means of altering reflectivity may involve the use of actuators activated by thermal (heating, cooling), piezoelectric, magnetic, electro-active, pneumatic and hydraulic means, for instance, embedded in at least one layer of the skin. Such elements may be used to induce expansion or contraction effects which produce flexing, stretching or deformation of the skin and thus produce a change in reflectivity. Changes to reflectivity can also be effected by inducing deformation of the skin by changing the dimensions of a skin-supporting frame by mechanical or other means. Changes in reflectivity can also be effected by inducing pressure changes under a skin which is sealed to a supporting frame which also provides an underlying cavity in which the pressure can be adjusted below or above the external ambient pressure.

To access the intended benefits of the skin it is important to be able to actively monitor, analyze and subsequently adjust the reflectivity of the skin when it is incorporated into a mobile system or device.

Monitoring the optical reflectivity can be achieved remotely or on the same platform as the device described herein. Remote monitoring may include remote imaging with a camera or similar device which relies on the illumination of the skin from another remote light source such as the sun. Another option would be to use a LIDAR or analogous detection system, which includes active tracking of the platform by a detection system and has an associated light source with defined wavelength and intensity characteristics.

Localized reflectivity monitoring on the same platform, may be achieved by incorporating one or more optical detectors mounted a portion of the platform that does not include the reflective skin. Alternatively, the optical detector(s) may be in proximity above or below the surface of the reflective skin. A detector mounted elsewhere on the platform would function analogously to a remotely located detector. A detector located in proximity above the skin would ideally be relatively small and only sample a representative area of the reflective skin such that it would not significantly mask the reflective behavior of the skin. To use a detector located in proximity below the skin, will be dependent of the skin exhibiting at least partially transmissivity at the desired wavelength of detection. By virtue of potentially reduced remote tracking, transmission lag and attenuation issues on-platform detector systems may be considered advantageous in some embodiments.

Reflectivity detectors including imaging and photo detection devices will typically be calibrated for wavelength and intensity and capable of providing an electrical output to ancillary readout or analysis systems. The calibrated output of these systems can then be fed directly, or remotely e.g. via an RF wireless link, to a control system on the platform which controls the reflectivity adjusting mechanism of the skin. Such a feedback loop provides the basis for tuning and optimizing the reflectivity performance of the skin. Standard methodologies such as dithering can also be applied for performance optimization.

Figure 1:
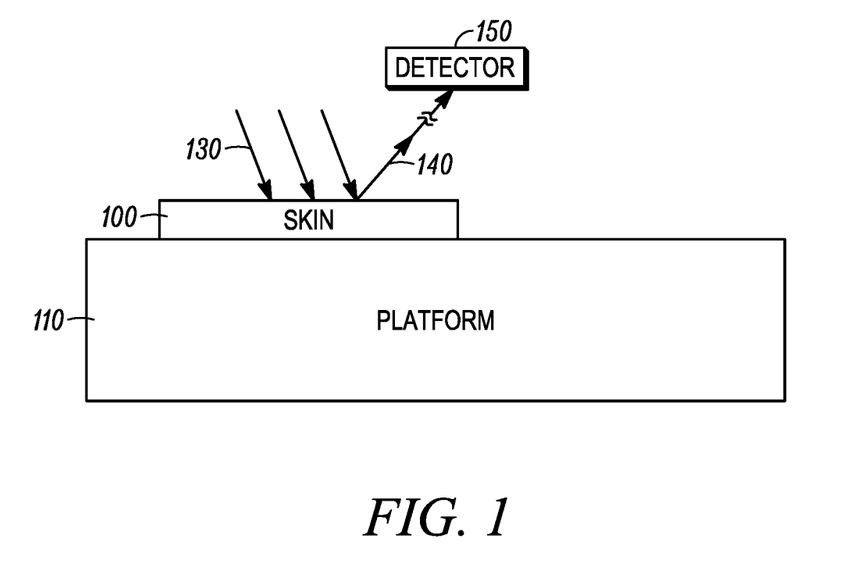
FIG. 1 shows one example of a tunable reflective skin that extends over a mobile platform and reflects light to a detector above the platform.

FIG. 1 shows one example of a tunable reflective skin 100 that extends over a mobile platform 110. The skin 100 may extend over the entirety of the platform or, as shown, just a portion thereof. For instance, if the mobile platform 110 is an aircraft, the skin 100 may extend over the aircraft wings and/or the fuselage. In some embodiments the mobile platform 110 may be incorporated in a mobile vehicle such as an automobile, aircraft or ship. The surface of the platform 110 on which the skin 100 extends may be planar or non-planar. Moreover, in some embodiments the mobile platform 110 may be an open frame, with the skin 100 only secured to the frame at its edges. That is, in this embodiment there may not be any supporting structure above or below the skin 100.

Incident light 130 received by the skin 100 is reflected as reflected light 140. The reflected light 140 is received by a detector device 150 that is used to monitor the optical reflectivity of the skin 100. The detector device 150 may be located on the platform 110 or it may be remotely located.

Figure 2:
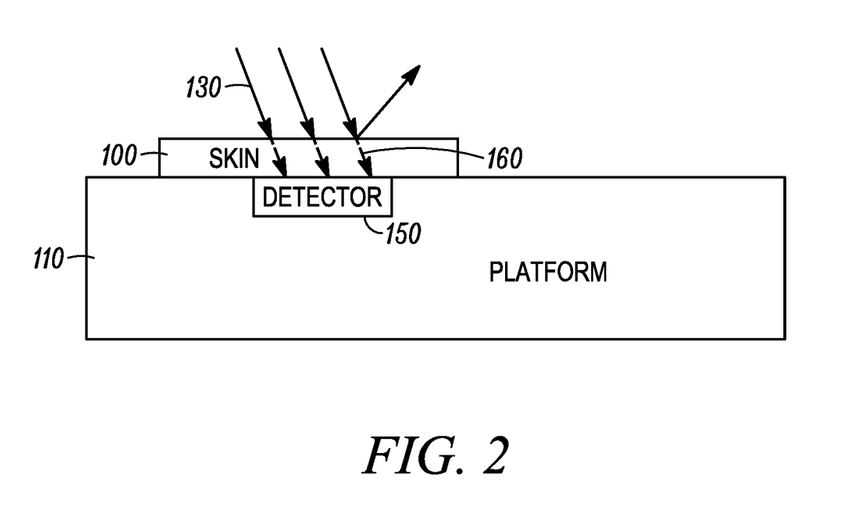
FIG. 2 shows another example of a tunable reflective skin that extends over a mobile platform and reflects light to a detector below the platform.

FIG. 2 shows another example of the tunable reflective skin 100 in which the detector device 150 is embedded in or located below the skin 100. In this case the detector device 150 monitors the light 160 being transmitted through the skin 100.

Figure 3:
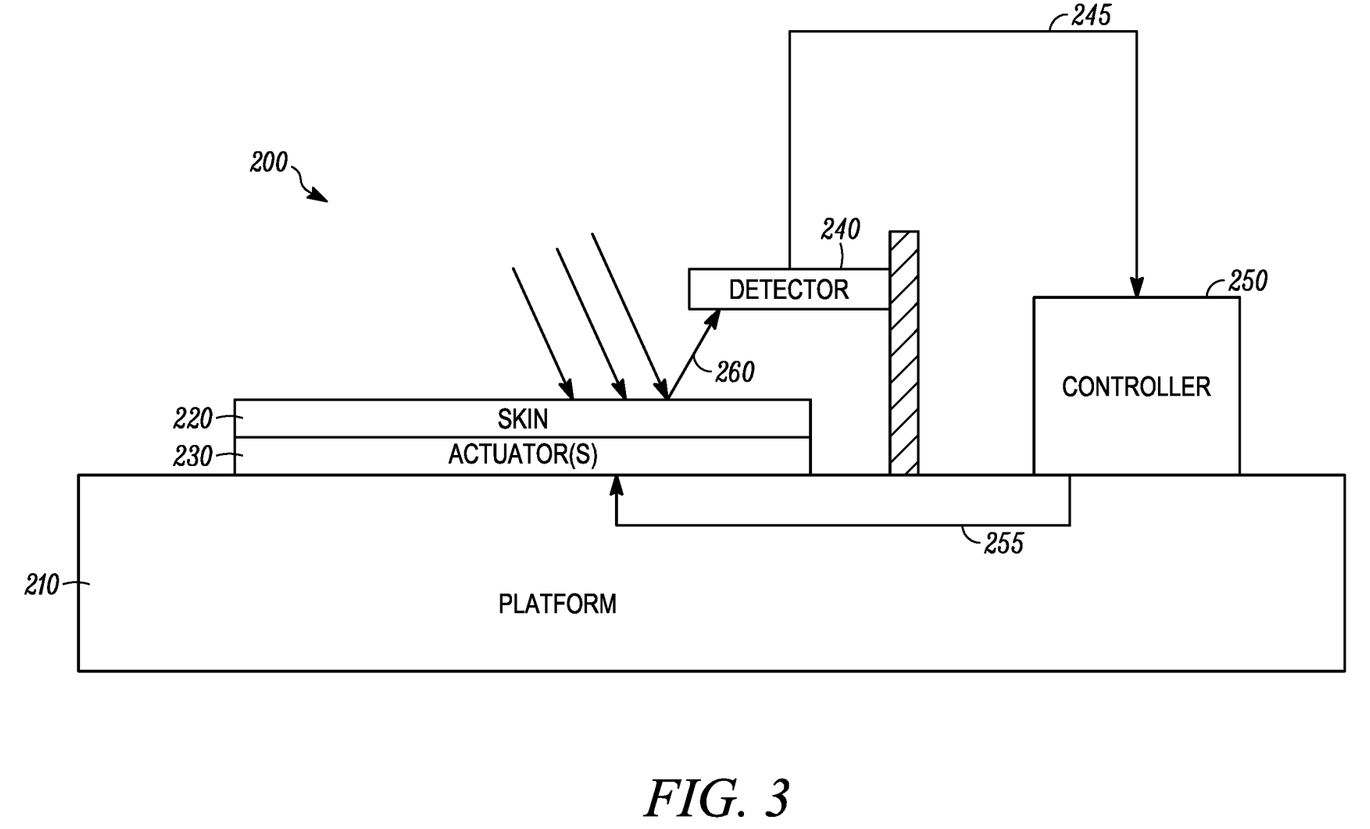
FIG. 3 shows a simplified schematic diagram of one example of a mobile system that includes a mobile platform on which a tunable reflective skin is located.

FIG. 3 shows a simplified schematic diagram of one example of a mobile system 200 that includes a mobile platform 210 on which a tunable reflective skin 220 is located. One or more actuators 230 or other activated elements are located below the tunable reflective skin 220 for flexing and/or stretching the skin 220. A detector 240 is located on the platform 210 for receiving light 260 reflected from the skin 220. A signal 245 from the detector 240 which is indicative of the reflectivity of the skin 220 is sent to a controller 250. The controller 250 may be located on the platform 210 or elsewhere on the mobile system 200. In response, the controller 250 generates a control signal 255 that is provided to the actuators 230 to thereby cause the flexing and/or stretching of the skin 220 and the consequent change in the optical reflectivity of the skin 220.

Figure 4:
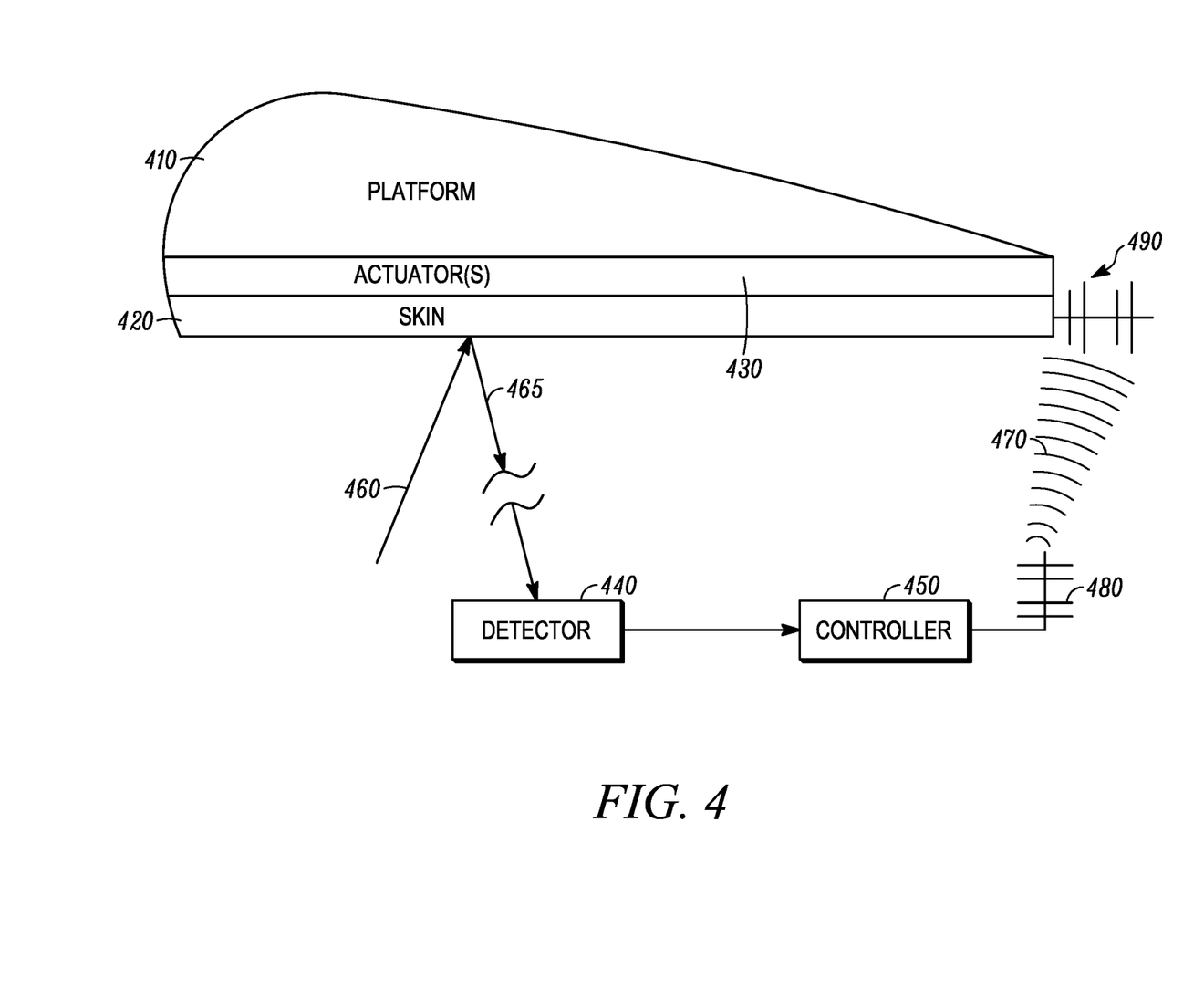
FIG. 4 shows a simplified schematic diagram of another example of a mobile system that includes an unmanned, aerial system (UAV) airfoil on which a tunable reflective skin is located.

FIG. 4 shows a simplified schematic diagram of another example of a mobile system 400, which in this example is a UAV. A tunable reflective skin 420 is located on an underside of a UAV airfoil 410, which is shown in cross-section. One or more actuators 430 or other activated elements are located between the skin 420 and the airfoil 410 for flexing and/or stretching the skin 420. In this case incoming light 460 from below is incident on the reflective skin 420 and reflected light 465 is incident on a remotely located detector 440. The output signal from the detector 440 is routed to a remote analyzer/controller 450. A control signal 470 is relayed in this case by RF wireless transmission from a transmitting antenna 480 to a receiving antenna 490 located on the mobile system 400. The receiving antenna 490, in turn, provides the control signal to the actuator(s) 430, which produces the flexure and/or stretching of reflective skin 420 and a consequent change in its reflectivity in response to the control signal. Instead of using RF wireless transmission, in some embodiments the control signal may be transmitted using optical communication.

Figure 5:
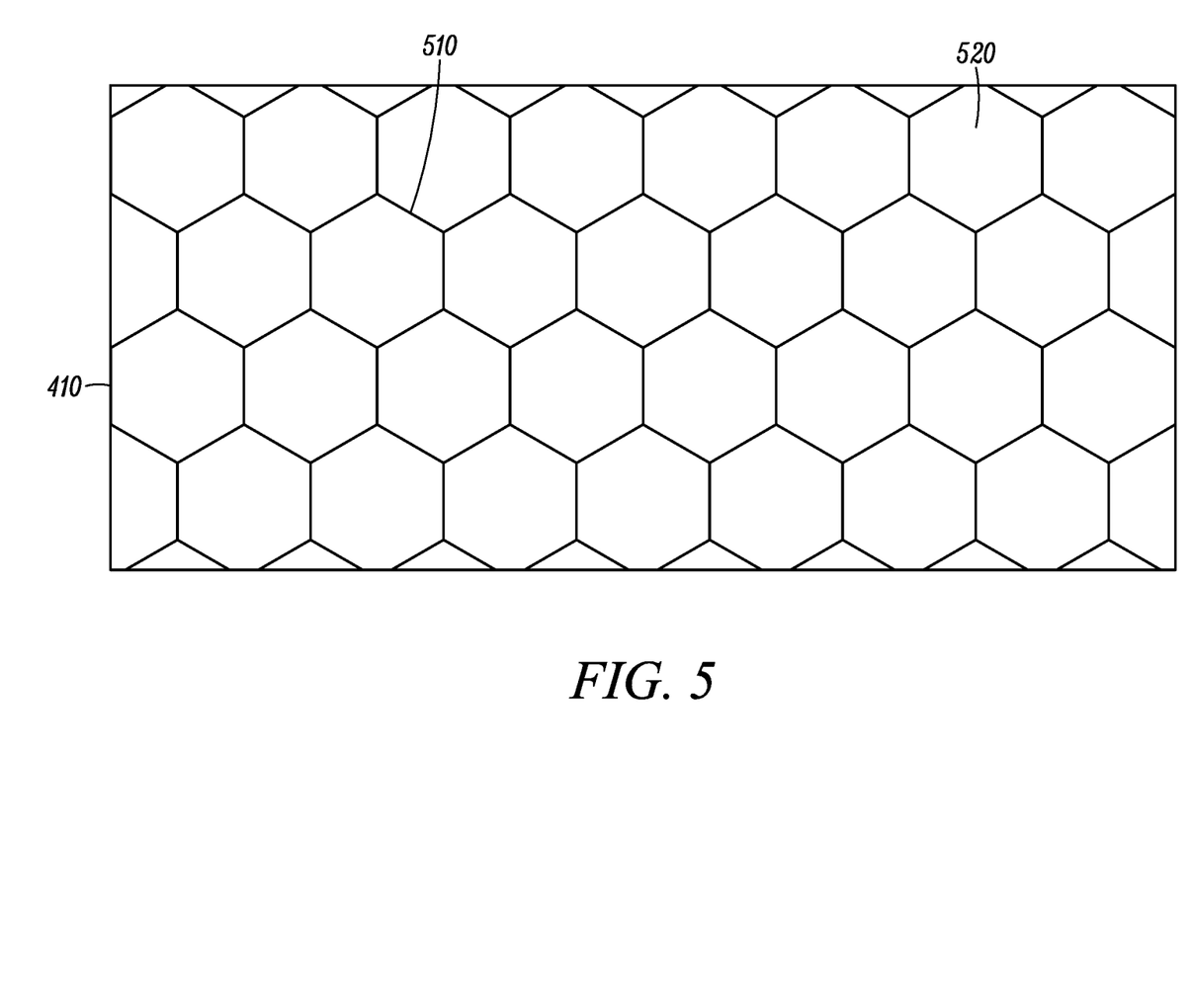
FIG. 5 shows a top plan view of one example of an unmanned, aerial system (UAV) airfoil having an open-frame structure over which a tunable reflective skin may extend.

FIG. 5 shows a top plan view of the UAV airfoil 410, which in this example has an open frame with a honeycomb internal structure defined by struts 510. Each region 520 between the struts 510 can serve as individual regions in which the skin can be locally deformed independently of the other regions to produce selective tuning of the reflective properties of the skin.

Illustrative examples of tunable reflective skins that may be employed in the mobile systems discussed above will now be presented.

Tunable Reflective Skins

The discrete skins may have physical structures which are resilient to significant mechanical or functional degradation or failure when stretched and, or flexed in the course of deployment or use. They may be comprised of ductile materials, if a single deployment is sufficient, or elastic materials if repeated or continuous bi-directional modification is required during use. In cases where the skin is comprised of multiple-layers the physical properties of the constituent layers should be sufficiently similar to maintain the integrity of the skin under conditions of use without mechanical, or functional, degradation. Examples of suitable skin materials include standard polymeric materials which meet the requirements of the application.

The preferred skins may comprise appropriate materials or surfaces to be able to function as discrete elements, such as structural skins, or to interface with supporting structures or surrounding media. Such interfacing may be achieved in a number of conventional ways by chemical, thermal, mechanical, electrical or other means and may include optional surface layers or materials to assist the interfacing process. Examples of such surface layers include layers comprised of standard adhesives.

The skins may have any of a number of transverse structures which enable the desired reflectivity. They may be comprised of mono-layers, which have constant, graded or varied refractive index. They may be comprised of a multi-layer where the layers have an engineered progression of refractive index. They may include nano-composite layers or nano-structured surfaces which may provide a wider range of engineered refractive index profiles than dense or single material layers. The skins may incorporate an interference stack of materials which change reflectivity when subject to flexing and stretching. The skins may also include grating structures, including sub-wavelength gratings, which exhibit varying reflectivity when stretched or flexed.

Figure 6A:
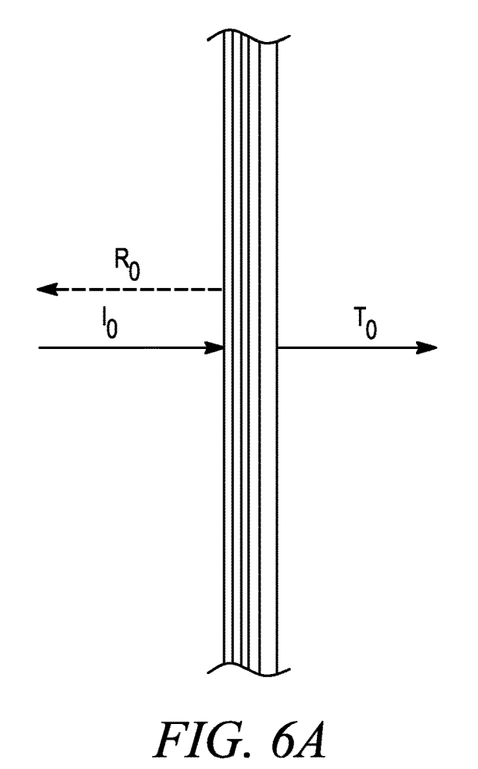
FIGS. 6(a) and 6(b) show a schematic representation of a tunable reflective multi-layer skin, with an optical interference stack.
Figure 6B:
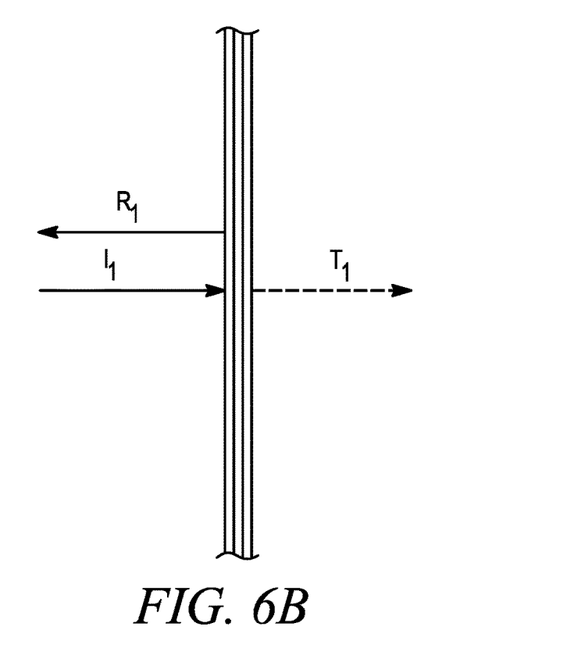

FIGS. 6(a) and 6(b) show a schematic representation of a multi-layer skin, with an optical interference stack. In the initial state, shown in FIG. 6(a), incident light (I0) is substantially transmitted (T0) through the skin with little or no reflection (R0). When stretched, as shown in FIG. 6(b) the dimension of the interference stack is reduced, potentially also changing the refractive index of the materials, and the structure becomes more reflective and incident light (I1) is substantially reflected (R1) with little or no transmission (T1). Conversely, the structure may be designed to be reflective in its initial state and transmitting when stretched. The structure can also be designed to produce intermediate levels of transmission and reflection for a defined range of deformation.

Figure 7A:
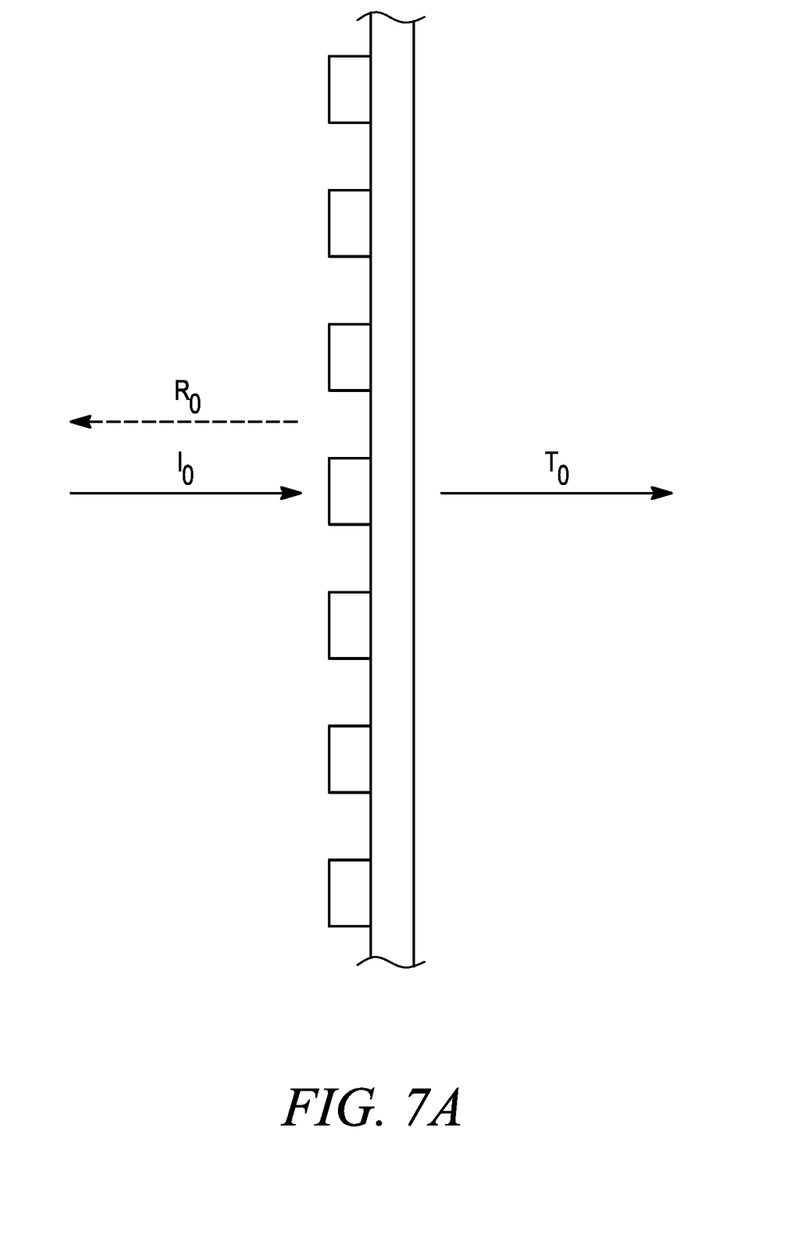
FIGS. 7(a) and 7(b) show another schematic representation of a tunable reflective skin, with a 1D grating on the surface.
Figure 7B:
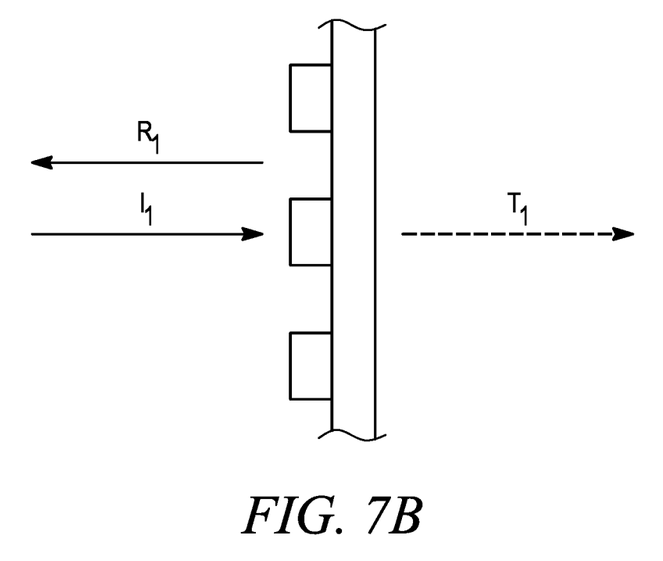

FIGS. 7(a) and 7(b) shows an analogous representation of a skin, with a 1D grating on the surface. As shown in an un-stretched condition of FIG. 7(a) the skin may be designed to be transmitting. When, the skin is stretched in FIG. 7(b) the dimension and periodicity of the grating changes and may become more reflective. The skin may also be designed for the reverse behavior and intermediate performance. When the skin is flexed it can be simultaneously stretched or compressed in various regions which can produce more complex, but predictable, reflection characteristics.

Figure 8:
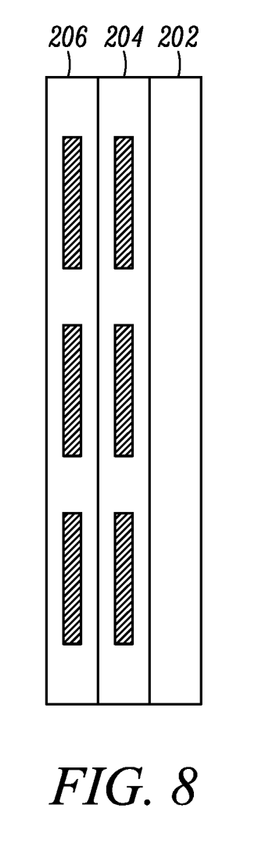
FIG. 8 shows an example of a tunable reflective skin having a plurality of layers.

FIG. 8 shows a skin having a plurality of layers 202, 204 and 206, As shown, layers 204 and 206 include structured gratings. As further shown, layer 204 is sub-surface layer.

Materials with suitable mechanical and optical properties include various polymers which are appropriately, elastic, or ductile. Depending on the optical structure employed they should also be suitable for chemical, or structural, modifiable to provide index variations, for patterning, or loading with a high index particles, including nano-particles. Examples include polymers which are polyethelene or polypropylene or fluoro-polymers such as ETFE and PVDF and structural or compositional modifications thereof, including composites, loaded with other materials or phases. Within a range the ETFE and modified derivatives can exhibit elastic behavior. The flexible skin should be sufficiently reflective under the conditions of use for the desired electromagnetic frequencies which may be in the ultra-violet, visible or infra-red regions of the spectrum. Embodiments with specular or diffuse reflective performance may be preferred.

In some embodiments, the thickness, and reflectivity of the respective layers or structures in the flexible skin should be in a range that changes in these parameters induced by stretching or flexing during deployment, or use, are sufficient to significantly alter the reflectivity of the skin from its performance prior to deformation.

In another embodiment, a multi-layer skin, with an optical interference stack as shown in FIG. 1 is provided. Such a skin may consist of alternating layers of ETFE, with different levels of high-index, nano-particle material loading to establish a desired index contrast. In the unperturbed state this skin may be substantially transparent. When stretched the periodicity of the interference stack will change and result in a change in the reflectivity of the skin. Conversely, the structure may initially be reflective and exhibit a change in transmission when stretched. The changes could be gradual or stepped in nature. If the skin is flexed, one surface may be stretched and the opposite surface compressed, producing more complex, but predictable, reflection characteristics. Asymmetric stretching could also be used to introduce, or change, the response to light of different polarizations.

In yet another embodiment, a skin with a reflective grating on the surface as shown in FIG. 2 is provided. The grating could be 1D, 2D or 3D in nature. Such a skin may consist of a nano-structured layer, or layers of ETFE. In an unperturbed state the skin could be transmitting. When stretched the dimension and periodicity of the grating will increase and could become more reflective. The skin may also be designed for the reverse behavior. These changes could be gradual or stepped in their response. When the skin is flexed it can be simultaneously stretched or compressed in various regions which can produce more complex, but predictable, reflection characteristics. Asymmetric stretching could also be used to introduce, or change, the response to light of different polarizations.

Illustrative Applications

Various use cases will be briefly presented below describing various applications in which mobile systems having a tunable optically reflective skin may be employed.
1. A mobile system may include a tunable reflector skin for remote optical imaging. In this embodiment sunlight, or light from some other source, is reflected from the mobile platform and captured by a remote receiver such as a camera. The skin may be tuned or set to adjust the intensity, wavelength or intermittency of the reflection for enhanced imaging.
2. A mobile system may include a tunable reflector skin for retro-reflective optical identification. In this embodiment light from a remote directional coherent light source, such as a laser, is reflected back to a receiver or receiver array, which may be collocated with the light source. The skin may be tuned, to modulate the intensity of reflected light, or other parameters, for enhanced identification.
3. A mobile system may include a tunable reflector skin for on-board optical receiver applications. In this embodiment the skin can be both reflective and transmissive. The skin may be tuned to adjust the wavelength or intensity of incident light on an underlying optical receiver. In this way saturation of the detector can be avoided and enable operation at a more optimal sensitivity.
4. A mobile system may include a tunable reflector skin for on-board transmitter applications. In this embodiment the skin may be tuned to adjust the wavelength, intensity or intermittency of outgoing light or optical signals from an underlying optical source, such as an LED. This can be used to adjust the wavelength, or restrict the intensity or range of an outgoing signal for specific applications or safety operating requirements.
5. A mobile system may include a tunable reflector skin for photovoltaic (PV) modules. In this embodiment the skin may be tuned to adjust the intensity of light in a given wavelength range from impinging on an underlying photovoltaic cell or module such as a solar call or module. This can be used to balance solar energy harvesting with usage and storage capacity.
6. A mobile system may include a tunable reflector skin for dynamic camouflage applications. In this embodiment the skin may be variably tuned over a sizeable area to mimic or otherwise synchronize with its environment or background for the purpose of camouflage.
7. A mobile system may include a large area, tunable reflector skin for on board underlying receiver or transmitter arrays. In this embodiment, the skin is used for arrays of underlying receivers or transmitters. The tuning may be uniform or variable over different sectors of the arrays.
8. A mobile system may include a large area, tunable reflector skin for multiple, dissimilar underlying devices. In this embodiment the skin may be locally tuned to meet the requirements of the underlying devices.

The processes performed by the analyzers/controllers described above may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive). However, computer readable storage media do not include transitory forms of storage such as propagating signals, for example.

The processes performed by the analyzers/controllers may also reflect the emergence and evolution of the internet of things (IOT), machine-to-machine (M2M) communications, artificial intelligence (AI) and machine learning.

In terms of IOT and M2M communications, the control communications may come via, or from, other platforms or machines, the control signals may also be distributed or duplicated to different mobile platforms to enable a collective response. For example control signals may be distributed to a plurality (e.g., a swarm) of UAVs or other mobile platforms. The possibility of coordinated reflectivity from the skins may add a level of capability in various applications for recognition, communications or other functionality.

In terms of AI and machine learning, the control system for individual or collective platform control may be either co-located on the mobile platform or remotely located and may have the ability to aggregate and/or adapt pre-programed algorithms, or responses, as "learned behavior" in regard to the reflectivity control and tuning. Such learning may be based on the combination and analysis of multiple sensory inputs, for example environmental, proximity, solar irradiance, geolocation or other inputs, in combination with the base reflectivity analysis. In this way a mobile platform, or a plurality of mobile platforms, can be actively tuned or optimized to provide a higher level performance than may be achieved using only the measured reflectivity. Indeed, complex learned behaviors may be initiated in response to "circumstance recognition" based on a data base of previously established effects of actuated control, and/or their holistic effect for performance and operations. One example of such control would be the selection of an appropriate learned response to minimize interference or conflicts in communications, image recognition or other system functionality, between autonomous platforms, structures, terrains or environmental conditions (e.g., humidity or airborne particulates).

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

In addition, it should be understood that the figures, which highlight the functionality and advantages of the present invention, are presented for illustrative purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

The invention claimed is:

1. A mobile system, comprising:
   a self-supporting platform;
   at least one continuous layer disposed on and secured to the self-supporting platform, the at least one continuous layer being at least partially reflective to optical energy at one or more optical wavelengths, the at least one continuous layer being substantially flexible and/or stretchable and having an optical reflectivity to incident electromagnetic radiation of a given wavelength which is selectively variable when flexed and/or stretched;
   one or more actuators for flexing and/or stretching the at least one continuous layer in response to receipt of a control signal; and
   a controller for generating the control signal based on a measured value of the optical reflectivity of the at least one continuous layer to the incident electromagnetic radiation of the given wavelength, wherein the one or more actuators are configured to cause the optical reflectivity of the at least one layer to be dynamically tuned by flexing and/or stretching the at least one layer in response to the control signal being dynamically adjusted based on sequential measurements of the optical reflectivity of the at least one layer to thereby tune the optical reflectivity of the at least one layer to a specifiable value.

2. The mobile system of claim 1, wherein the one or more actuators are selected from the group consisting of thermal, piezo-electric, magnetic, electro-active, pneumatic and hydraulic activated devices.

3. The mobile system of claim 1, wherein the self-supporting platform is selected from the group consisting of an Unmanned Aerial Vehicle (UAV), an Unmanned Marine Vehicle (UMV), an Unmanned Ground Vehicle (UGV) and a wearable platform.

4. The mobile system of claim 1, further comprising an optical detector located on the self-supporting platform for monitoring the optical reflectivity of the at least one layer and providing the measured value of the optical reflectivity to the controller.

5. The mobile system of claim 1, wherein the controller is configured to generate the control signal so that the optical reflectivity of the at least one layer is tuned to enhance remote optical imaging of the mobile system.

6. The mobile system of claim 1, wherein the controller is configured to generate the control signal so that the optical reflectivity of the at least one layer is tuned to enhance retro-reflective remote optical identification of the mobile system.

7. The mobile system of claim 1, wherein the controller is configured to generate the control signal so that the optical reflectivity of the at least one layer is tuned to enhance remote positional tracking of the mobile platform.

8. The mobile system of claim 1, further comprising an optical receiver underlying the at least one layer.

9. The mobile system of claim 8, wherein the controller is configured to generate the control signal so that an optical transmissivity of the at least one layer is tuned to enhance the performance of the optical receiver.

10. The mobile system of claim 8, wherein the optical receiver includes a photovoltaic device.

11. The mobile system of claim 1, further comprising an optical transmitter underlying the at least one layer.

12. The mobile system of claim 11, wherein the controller is configured to generate the control signal so that an optical transmissivity of the at least one layer is tuned to enhance the performance of the optical transmitter.

13. The mobile system of claim 1, wherein the controller is configured to generate the control signal so that an intensity of light reflected or transmitted by the at least one layer is modulated to facilitate communication or identification.

14. The mobile system of claim 1, wherein the controller is configured to generate the control signal based on measured values of the optical reflectivity obtained by an imaging system.

15. The mobile system of claim 1, wherein the one or more actuators includes a plurality of actuators for flexing and/or stretching different portions of the at least one layer independently of one another, the controller being configured to provide different control signals to the different actuators.

16. The mobile system of claim 1, further comprising one or more optical detectors remotely located from the self-supporting platform for monitoring the optical reflectivity of the at least one layer and providing measured value(s) of the optical reflectivity to the controller.

17. The mobile system of claim 1, wherein the controller is further configured to generate the control signal based on coordination with one or more additional mobile platforms that have a tunable reflective skin.

18. The mobile system of claim 1, wherein the controller is further configured to generate the control signal based on machine-to-machine communication with at least one device remotely located from the mobile platform.

19. The mobile system of claim 1, wherein the controller is further configured to generate the control signal by accessing a data base of previously learned responses to optical reflectivity adjustments to the at least one layer.

20. The mobile device of claim 1 wherein the film or skin exhibits elastic behavior.

21. The mobile device of claim 20 wherein the selectively variable optical reflectivity of the film or skin arises from changes in at least one characteristic of a grating or interferometric layered structure in the film or skin.

* * * * *